United States Patent
Appercel

(10) Patent No.: US 8,446,615 B2
(45) Date of Patent: May 21, 2013

(54) METHOD, APPARATUS AND COMPUTER PROGRAM PRODUCT FOR VIEWING ON A CLIENT COMPUTER DOCUMENTS DATA TO BE PRINTED

(75) Inventor: Stephane P. R. Appercel, Massy (FR)

(73) Assignee: Oce-Technologies B.V., Venlo (NL)

( * ) Notice: Subject to any disclaimer, the term of this patent is extended or adjusted under 35 U.S.C. 154(b) by 1160 days.

(21) Appl. No.: 11/434,811

(22) Filed: May 17, 2006

(65) Prior Publication Data

US 2006/0274346 A1    Dec. 7, 2006

(30) Foreign Application Priority Data

May 17, 2005    (EP) .................................... 05291055

(51) Int. Cl.
*G06F 3/12*    (2006.01)

(52) U.S. Cl.
USPC ........ 358/1.15; 358/1.13; 358/1.16; 709/202; 709/203

(58) Field of Classification Search
USPC ............. 358/1.9, 1.15, 1.18, 1.12, 1.13, 1.16; 709/202, 203
See application file for complete search history.

(56) References Cited

U.S. PATENT DOCUMENTS

| | | | | |
|---|---|---|---|---|
| 5,580,177 A | * | 12/1996 | Gase et al. | ...................... 400/61 |
| 6,236,462 B1 | * | 5/2001 | Terasaka | ...................... 358/1.13 |
| 6,714,964 B1 | | 3/2004 | Stewart et al. | |
| 6,788,428 B1 | * | 9/2004 | Shimokawa | ................. 358/1.15 |
| 7,584,242 B2 | * | 9/2009 | Ebuchi | .......................... 709/203 |
| 2002/0067504 A1 | | 6/2002 | Salgado et al. | |

FOREIGN PATENT DOCUMENTS

| | | |
|---|---|---|
| EP | 0 803 795 A1 | 10/1997 |
| JP | 11-134148 A | 5/1999 |
| JP | 2002-207585 A | 7/2002 |
| JP | 2004-126965 A | 4/2004 |

\* cited by examiner

*Primary Examiner* — Vu B Hang
(74) *Attorney, Agent, or Firm* — Birch, Stewart, Kolasch & Birch, LLP

(57) ABSTRACT

A method, an apparatus and a computer program enable viewing of data of documents to be printed on a client computer. A client computer includes a version y of a conversion function for converting document data into raster image data and a version z of a client viewer application. A print server includes a version x of the conversion function and a version x of the client viewer application. The method includes the steps of replacing the version y of the conversion function by the version x of the conversion function on the client computer, if the version x is more recent than the version y; installing the version x of the client viewer application on the client computer, if the version z is different from the version x; converting the document data on the client computer; and displaying the image data.

19 Claims, 3 Drawing Sheets

METHOD, APPARATUS AND COMPUTER PROGRAM PRODUCT FOR VIEWING ON A CLIENT COMPUTER DOCUMENTS DATA TO BE PRINTED

CROSS-REFERENCE TO RELATED APPLICATIONS

This nonprovisional application claims priority under 35 U.S.C. §119(a) on Patent Application No. 052910551.1, filed in Europe on May 17, 2005, the entirety of which is incorporated herein by reference.

BACKGROUND OF THE INVENTION

1. Field of the Invention

The present invention relates to a method for viewing on a display unit of a client computer image data representing document data to be rendered by a print engine on a print medium according to print specifications, the client computer being arranged for exchanging data with a print server through a network, the print server being arranged for sending print instructions to the print engine, the client computer comprising a version y of a conversion function for converting document data into raster image data describing a dot arrangement to be rendered by the print engine and a version z of a client viewer application for viewing the image data according to the print specifications, the print server comprising a version x of the conversion function and a version x of the client viewer application.

The present invention also concerns an apparatus comprising a print engine, a client computer with display means for viewing image data representing document data to be rendered by the print engine on a print medium according to print specifications, a print server for sending print instructions to the print engine and arranged for exchanging data with the client computer through a network, the client computer having stored on a memory a version y of a conversion function for converting document data into raster image data describing a dot arrangement to be rendered by the print engine and a version z of a client viewer application for viewing the image data according to the print specifications, the print server having stored on a memory a version x of the conversion function and a version x of the client viewer application.

The present invention also concerns a computer program product residing on a computer readable medium comprising instructions for causing at least one process unit to carry out the method of the present invention.

2. Description of Background Art

Most networks include a number of print servers for sending print instructions to print engines and a number of client computers sharing the resources of the print servers so that many users of the network may use the print engines. Documents to be printed are sent from a client computer using a job submitter that transmits a print job from the client computer to the print server. The print jobs are executed by the print engine according to print instructions sent by the print server.

Before actually printing a document on a selected print engine, a user may need to preview the document as it will be printed by the print engine to verify that the print specifications are correct and that graphics and outline fonts will be rendered properly. The client computer is provided with a display unit, such as a monitor screen, whereon image data representing document data to be rendered by a print engine on a print medium according to print specifications can be displayed. To ensure a proper preview, a conversion function is installed on the client computer for converting document data into raster image data describing a dot arrangement as to be rendered by the print engine. The conversion function includes an interpreter function and a rasterizer function. A dedicated application software installed on the client computer, called a client viewer application, is used for viewing the image data according to the print specifications. For example, print specifications such as medium size and positioning of the image data on the medium can be checked during the preview step. Other print specifications may be also visualized, such as the orientation of the image data with respect to the print medium, the dimensions of the print margins, the position of a staple, the presence of a watermark, etc.

The print server is provided with a controller having installed thereon a conversion function. The conversion function includes an interpretation function and a rasterization function. The interpretation function of the controller examines the data sent from the client computer and identifies the command embedded in the data, such as printer control, page format, font management, text layout and graphics. The print server conversion function is used to convert the received commands into an array of dots to be rendered by the print engine. The print server is provided with a raster image processor (RIP) for executing the conversion tasks. The print server can also be provided with a version of a client viewer application in order to update the client viewer application on the client computer when this is required. This may be needed when the print engine has been upgraded with new technical features enabling the use of new print settings.

To ensure consistency between the preview displayed on the client's display unit and the image data to be printed by the print engine (i.e. a dot arrangement to be rendered by the print engine), a known method includes systematic updating of the software installed on the client computer with every update of the print server's software. According to the known method, the version of the client viewer application and the version of the conversion function on the client computer are updated each time the conversion function of a print server is updated. When a user of a client computer wishes to obtain a preview of a document to be printed on a print engine, it connects to the adequate print server in order to compare the versions of the software installed on the respective machines. The print server includes, for example, a version x of the conversion function and a version x of the client viewer application. If the versions of the conversion function and of the client viewer application on the client computer are different from the version x, a version x of the conversion function and a version x of the client viewer application are transferred to the client computer. However, this method has a number of drawbacks, such as complexity. This is particularly the case for large network systems, where many users have the ability to connect to a large number of print servers. Usually, not all print servers arranged for sending print instructions to the same type of print engine are updated at the same moment. Therefore, it happens that various print servers use different versions of the conversion function. With the known method of viewing wherein a systematic update of the client computer software is performed, the software on the client computers can have a very large footprint, because of the many versions installed thereon, which generates high costs. Moreover, the systematic upgrade might overload a print server when many users are connected concurrently to the print server.

SUMMARY OF THE INVENTION

The present invention seeks to provide a method in which these problems are mitigated. It is accordingly an object of the present invention to provide an improved method for viewing on a client computer documents data to be printed.

According to an embodiment of the present invention, this object is achieved by the steps of:

replacing the version y of the conversion function by the version x of the conversion function on the client computer, if the version x is more recent than the version y;

installing the version x of the client viewer application on the client computer, if the version z is different from the version x;

converting the document data into raster image data on the client computer, using the version of the conversion function on the client computer; and displaying image data representing document data to be rendered according to the print specifications, using the version x of the client viewer application.

In the viewing method according to the present invention, the print server is involved only for the supply to the client computer of a version of the conversion function and a version of the client viewer application, if certain conditions are fulfilled. It may happen that the version y of the conversion function installed on the client computer is more recent than the version x1 of the conversion function installed on a first print server with which print data are to be exchanged. This may happen when the client computer previously had been connected to another second print server having the latest version x2 available of the conversion function and the client computer had been updated with the version x2 of the conversion function and the version x2 of the client viewer application. In such a case (y=x2), wherein the version y of the conversion function installed on the client computer is more recent than the version x1 installed on a first print server with which print data are to be exchanged, there is no transfer of the conversion function from the first print server to the client computer. This is generally not required, thanks to the backward compatibility of the conversion function. However, in this situation, the version x1 of the client viewer application, which is present on the print server, is installed on the client computer. This ensures that the image data can be viewed according to the print specifications. This is achieved by a version x1 of the client viewer application having the same release as the version x1 of the conversion function installed on the first print server. Summarizing this example, the conversion function on the client computer remains x2 and a version x1, less recent than x2, of the client viewer application is installed on the client computer.

It can be noted that the print server is not involved in the step of converting the document data into raster image data for viewing purposes. A major benefit is that a large number of users, each one logged on a different client computer can view image data representing document data to be rendered by a print engine without overloading the print server, which would be the case if the step of converting the document data into raster image data for viewing purposes was performed on the print server by many users. Of course, the resolution of the image displayed on the display unit of the client computer (for example, 100 dpi) may differ from the resolution of the dot arrangement to be rendered by the print engine (for example 600 dpi). Moreover, the colors in the document are rendered by the display device using a different color separation from the one used by the print engine. However, the view obtained on the display unit is as accurate as possible, mainly due to the fact that the use of the conversion function leads to a similar visual aspect of the raster image data rendered by both the client computer's display unit and the print engine.

The apparatus according to an embodiment of the present invention includes the client computer and the print server each comprising a processor unit for applying an update and viewing algorithm that executes the steps of:

replacing the version y of the conversion function by the version x of the conversion function on the client computer, if the version x is more recent than the version y;

installing the version x of the client viewer application on the client computer, if the version z is different from the version x;

converting the document data into raster image data on the client computer, using the version of the conversion function on the client computer;

displaying image data representing document data to be rendered according to the print specifications, using the version x of the client viewer application.

The present invention relates to a method, an apparatus and a computer program for viewing on a client computer documents data to be printed. A client computer includes a version y of a conversion function for converting document data into raster image data and a version z of a client viewer application. A print server includes a version x of the conversion function and a version x of the client viewer application. The method comprises the steps of replacing the version y of the conversion function by the version x of the conversion function on the client computer, if the version x is more recent than the version y; installing the version x of the client viewer application on the client computer, if the version z is different from the version x; converting the document data on the client computer; and displaying the image data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
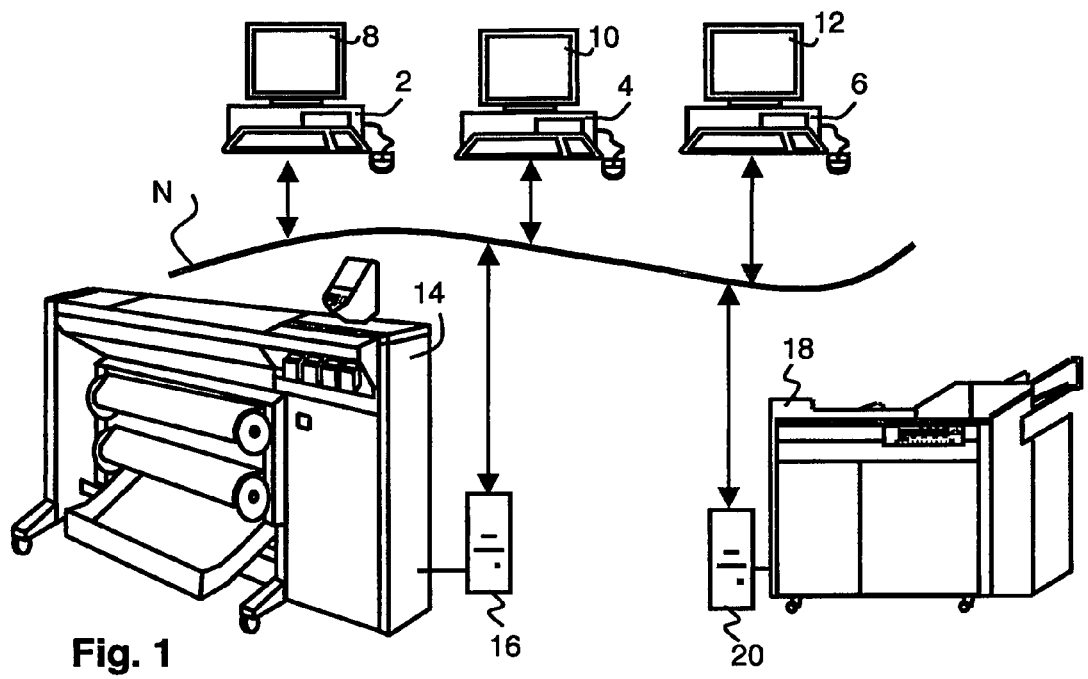
FIG. 1 is a schematic diagram of a number of clients connected to a number of print servers in a network environment, for use in connection with an embodiment of the present invention.

Preferred embodiments of the present invention will now be described with reference to the accompanying drawings, wherein the same or similar elements are identified with the same reference numerals throughout the several views.

The present invention can be used for viewing any type of document to be printed, and is particularly useful for viewing wide format original color images with randomly distributed areas containing small details. Engineering drawings are a typical example of such originals. The documents to be printed can have formats such as HP-GL/2, Calcomp, PostScript/PDF, etc. The method according to the present invention is particularly useful when vector-based graphics are to be viewed on the client computer before printing them. It is particularly useful to obtain a view of vector-based graphic objects such as a line, since critical visual aspects such as line thickness and colors can be checked before actually printing. It is also very useful in order to obtain a proper view of outline fonts.

FIG. 1 shows a system comprising a number of client computers 2, 4, 6, a number of print engines 14, 18 and a number of print servers 16, 20 connected by a local network N. The print servers 16 and 20 are used for sending print instructions to the print engine 14 and the print engine 18, respectively. The client computers 2, 4, 6 are connected through a network N to the print servers 16 and 20 of which they share resources. The client computers 2, 4, 6 are workstations, for example, to which display units 8, 10, 12 are connected, respectively. A client computer (for example the workstation 4) includes at least one central processing unit 50 (shown in FIG. 3), a random access memory 52, a hard disk 54, a graphic card 56 and a network card 58. A display unit 10, such as a monitor, is connected to the client computer 4 for displaying purposes. The client computer 4 also includes input means 60, for example a keyboard and a mouse or other indicator instruments. A user that has a document stored on the hard disk 54 and wants to print the document can choose for that purpose from a number of print engines connected to the local network N, such as the print engines 14 and 18.

Figure 2:
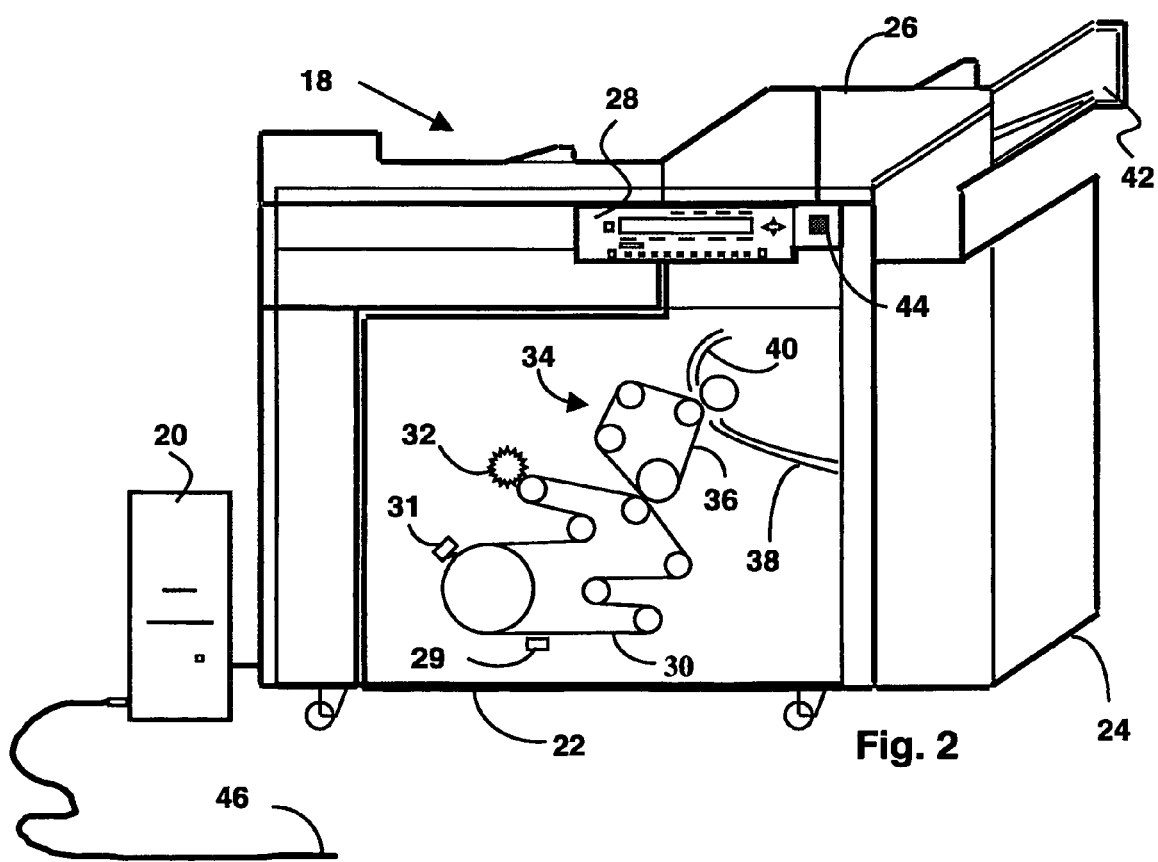
FIG. 2 is a schematic diagram of a print engine and a print server, for use in connection with an embodiment of the present invention.

FIG. 2 shows a print server 20 for sending print instructions to a print engine 18 of which various parts are illustrated diagrammatically. The print engine 18 can use any number of printing techniques. It can be a thermal inkjet printer, a pen plotter, or a press system based on organic photoconductor technology, for instance. Color printing is achieved, for example, using an inkjet printer provided with four different basic inks, such as cyan, magenta, yellow and black. In the example of FIG. 2, the print engine 18 includes a printer unit 22 for making prints of images on print media in accordance with digital image data, a supply unit 24, a finishing and outputting section 26 for print media and a user interface unit 28. The control unit 62 and the network connection unit (network card) 64 of the print server 20 are connected to different parts of the print engine 18.

The printer unit 22 shown in FIG. 2 includes an electrophotographic processing stage that is known per se, in which a photo-conductive medium 30 in the form of a belt is charged by means of a corona unit 29 and then exposed by means of an LED array 31 in accordance with digital image data. The charged image thereby formed on the medium 30 is developed with toner powder in a developing unit 32, after which the toner image is transferred, in a combined transfer and fixing unit 34, to a heated rubber belt 36. The toner powder softens on the heated rubber belt 36 as a result of the heat of the belt 36 and becomes tacky. The toner powder is then transferred and fixed on a print medium, usually a sheet of paper, fed from a supply stage via a conveyor 38.

A supply of print media, for example sheets of paper in different sizes and orientations is available in the supply unit 24. The print media with the toner image are transported via a conveyor 40 to the finishing and outputting section 26, which if necessary collates them into sets and staples them and then deposits them in the delivery tray 42.

The user interface panel of the unit 28 is provided with a display screen and keys. The user interface unit 28 is connected to the control unit 62 and the network connection unit (network card) 64 of the print server 20. The unit 28 also includes a contact lock 44 for switching on and off the print engine and other input means such as buttons for selecting a user, setting queuing parameters, etc.

Figure 3:
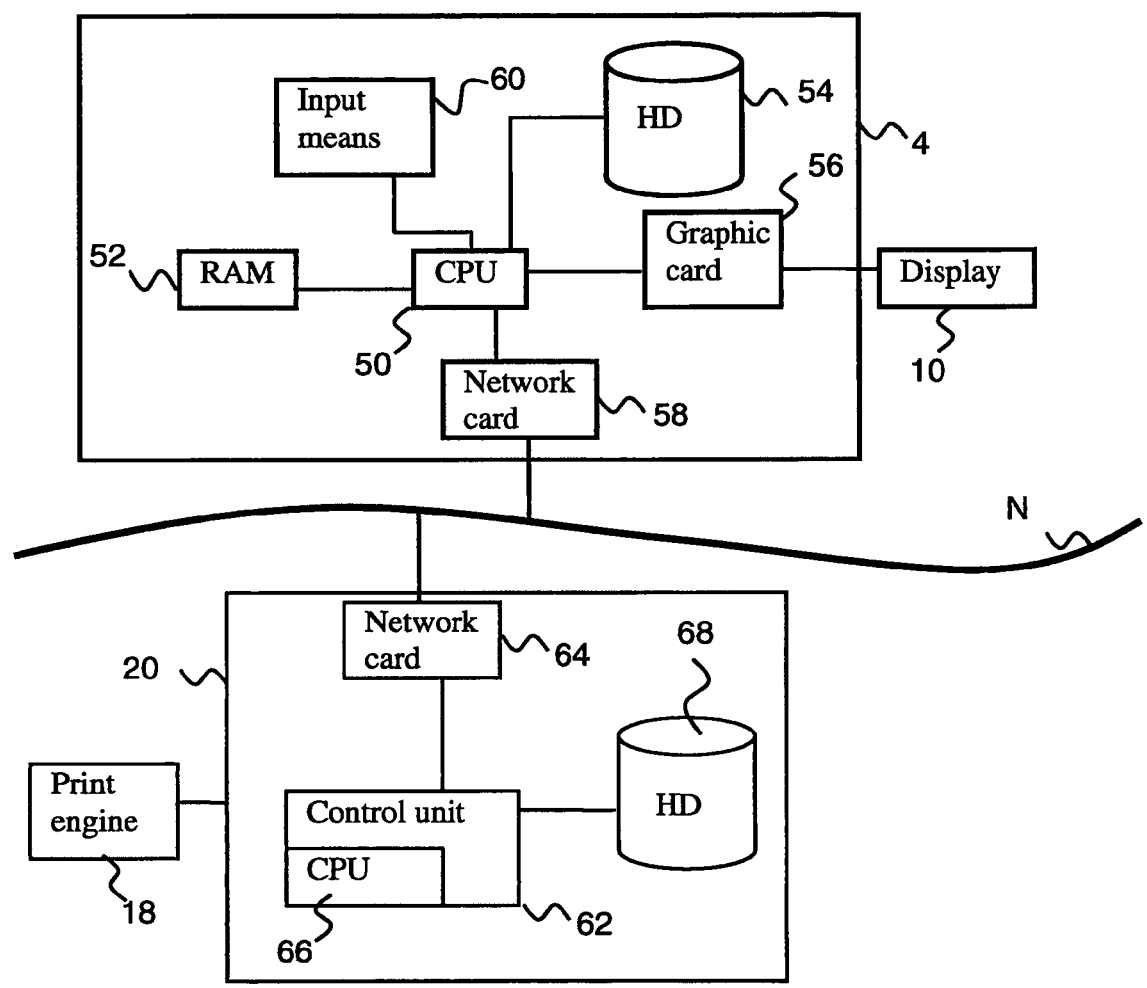
FIG. 3 is a simplified component diagram comprising an embodiment of an apparatus according to the present invention.

The control unit 62 of the print server 20 is connected to the print engine 18 as is diagrammatically shown in FIG. 3. The control unit 62 includes a central processing unit (CPU) 66 and can access a memory 68 such as a hard disk and suitable hardware circuits. The control unit 62 further includes modules for controlling the units 22, 24, 26 and 28 of the print engine 18. The control unit 62 also includes an image processing module for processing the digital image data so that prints of good image quality can be made by the printer unit 22.

The print server 20 connected to the print engine 18 also includes a network connection unit (network card) 64 for connection to a local network N, which is diagrammatically shown in the form of a cable 46 in FIG. 2. The network connection unit 64 receives print jobs from the client computers (for example, from one of the workstations 2, 4 or 6), converts the print jobs into a format that can be processed by the print unit 22 and ensures in co-operation with the control unit 62 that the digital images are printed on print media.

Figure 4:
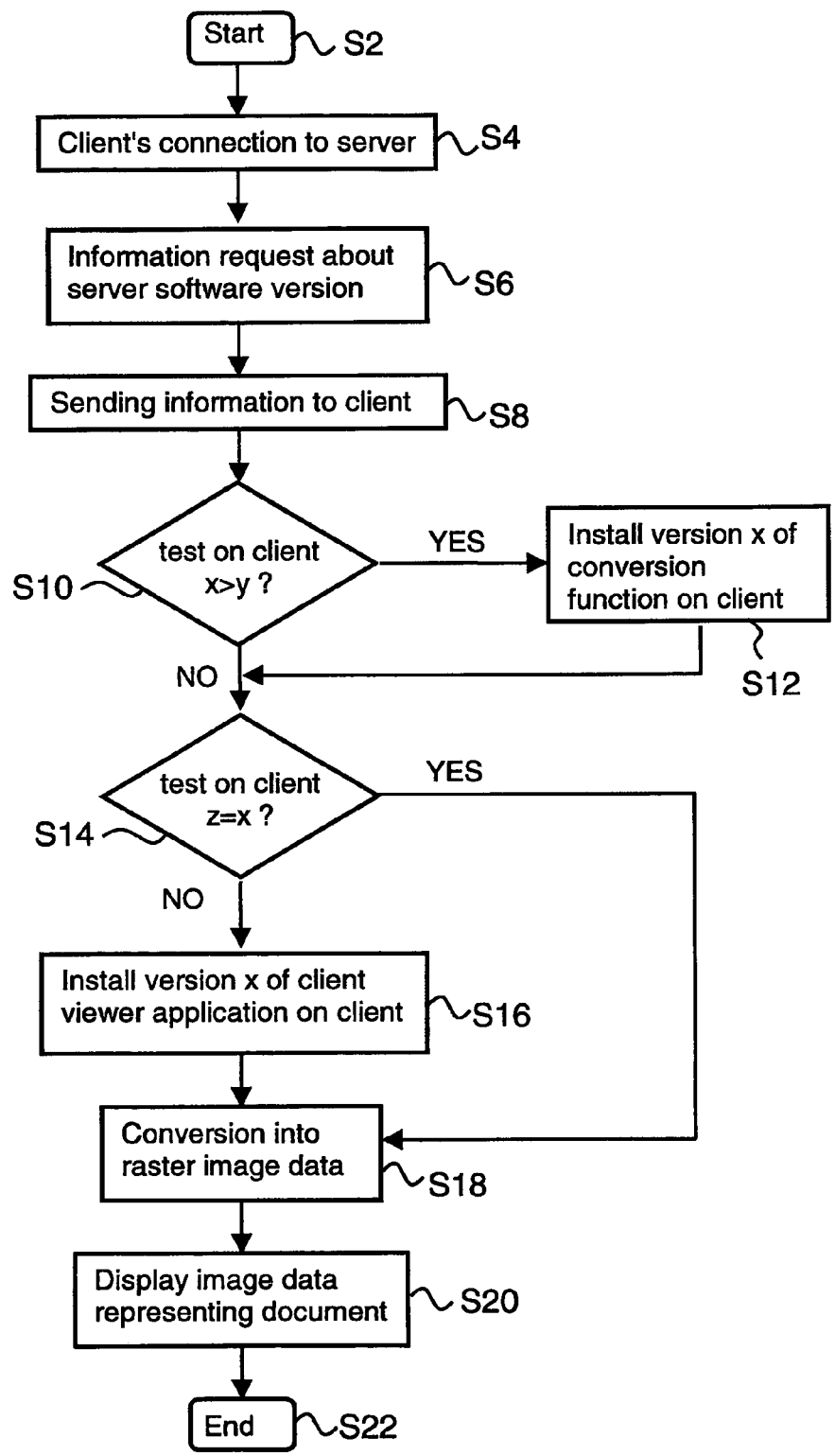
FIG. 4 is a flow diagram showing an embodiment of the method according to the present invention.

An embodiment of the method according to the present invention will now be explained with reference to FIG. 4. In step S2, a computer program is started by a user logged on a client computer 4. The user wishes to preview on a display unit (monitor) 10 document data to be rendered by a selected print engine 18 on a print medium according to print specifications. The computer program then performs the steps of the diagram shown in FIG. 4. The client computer 4 is provided with a display unit 10 such that image data representing the document data can be viewed by the user to control the aspect of the dot arrangement to be printed on a print medium.

The client computer includes a version y of a conversion function for converting document data into raster image data describing a dot arrangement to be rendered by the print engine 18 and a version z of a client viewer application for viewing the image data according to the print specifications. The version y of the conversion function and the version z of the client viewer application are for example installed on the hard disk 54 of the client computer 4 in the form of executable programs. To ensure consistency between the preview to be displayed on the display unit 10 and the image to be printed by the print engine 18, the client viewer application has to be aware of the parameters specific to the selected print engine 18, for example printer margins, print medium available, paper size, positioning of the printed image with respect to the paper, etc. Therefore, in step S6, information about the print server 20 is requested by the client computer 4 through the network N.

The print server 20 for sending print instructions to the selected print engine 18 includes a version x of the conversion function and a version x of the client viewer application. The version x of the conversion function and the version x of the client viewer application are for example stored on the hard disk 68 of the print server 20 in the form of executable programs. The print server 20 is suitable for supplying, among other client computers, a client computer 4 with applications such as a conversion function and a client viewer application. The information requested by the client computer 4, i.e. the version number x of the conversion function, is sent through the network N by the print server to the client computer in step S8.

In step S10, a test is performed on the client computer 4 in order to determine whether the version x of the conversion function is more recent than the version y of the conversion function. If the version x of the conversion function is more recent than the version y of the conversion function (i.e. if x>y) then step S12 is performed. In step S12, the version y of the conversion function is replaced on the client computer by the version x of the conversion function. In a network environment where the client computer 4 can exchange data with a number of print servers for sending print instructions to the same type of print engine, the combination of step S10 with step S12 ensures that the client computer 4 is provided with the most recent version of the conversion function among the versions installed on the print servers it connects to. Generally, a conversion function is backwards compatible with older conversion functions, meaning that a more recent version is able to perform the tasks that a previous version was able to perform. After the step S12 has been completed, the program goes to step S14.

If the result of the test performed in step S110 is no, meaning that the version x of the conversion function on the print server 20 is as recent or less recent than the version y of the conversion function on the client computer 4, then the application goes directly to step S14.

In step S14, in order to determine whether the version z of the client viewer application on the client computer 4 is the same as the version z of the client viewer application on the print server 20, a Boolean test is performed by the program. If the versions z and x are the same, the program causes the steps S18 and S20 to be started. If the version z of the client viewer application on the client computer is not the same as the version x of the client viewer application installed on the print server, then step S16 is performed. In step S16, the version x of the client viewer application is installed on the client computer. After step S16, the steps S118 and S20 are performed.

In step S18, the document data are converted on the client computer 4 into raster image data for viewing purposes using the version of the conversion function installed on the client computer.

In step S20, image data representing document data to be rendered according to the print specifications is displayed using the version x of the client viewer application. It should be noted that this version x has the same number as the version x of the conversion function installed on the print server 20 for print purposes. This ensures that the view obtained in the display unit 10 has a visual aspect as accurate as possible, taking into account the dot arrangement of the raster image to be rendered by the print engine and a correct visual representation of the print specifications such as print medium dimensions and position of the image on the print medium.

At step S22, the program ends, and the user may choose to print the document data on the selected print engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for viewing image data on a display unit of a client computer, the image data representing document data to be rendered by a print engine on a print medium according to print specifications, the client computer being arranged for exchanging data with a print server through a network, the print server being arranged for sending print instructions to the print engine, the client computer including a version y of a conversion function for converting document data into raster image data describing a dot arrangement to be rendered by the print engine and a version z of a client viewer application for viewing the image data according to the print specifications, the print server including a version x of the conversion function and a version x of the client viewer application, said method comprising the steps of:

replacing the version y of the conversion function by the version x of the conversion function on the client computer, if the version x is more recent than the version y;

installing the version x of the client viewer application on the client computer, if the version x is more recent than the version z;

installing the version x of the client viewer application on the client computer, if the version x is less recent than the version z;

converting the document data into raster image data on the client computer, using the version of the conversion function on the client computer; and displaying image data representing document data to be rendered according to the print specifications, using the version x of the client viewer application.

2. The method according to claim 1, wherein the print specifications include a number of parameters specific to the print engine.

3. The method according to claim 2, wherein a parameter specific to the print engine is the format of the print medium.

4. The method according to claim 2, wherein a parameter specific to the print engine is the position of the image data with respect to the print medium.

5. The method according to claim 3, wherein a parameter specific to the print engine is the position of the image data with respect to the print medium.

6. The method according to claim 1, wherein the print specifications include a scaling factor to be applied to the image data.

7. The method according to claim 2, wherein the print specifications include a scaling factor to be applied to the image data.

8. The method according to claim 1, wherein the print specifications include an angle of a rotation to be applied to the image data.

9. The method according to claim 2, wherein the print specifications include an angle of a rotation to be applied to the image data.

10. An apparatus, comprising:

a print engine;

a client computer, said client computer including a display unit for viewing image data representing document data to be rendered by the print engine on a print medium according to print specifications;

a print server for sending print instructions to the print engine and being arranged for exchanging data with the client computer through a network, the client computer having a version y of a conversion function and a version z of a client viewer application stored in a memory, the version y of the conversion function for converting document data into raster image data describing a dot arrangement to be rendered by the print engine and the version z of a client viewer application for viewing the image data according to the print specifications, the print server having a version x of the conversion function and a version x of the client viewer application stored in a memory, the client computer and the print server each including a processor unit for applying an update and viewing algorithm that executes the steps of:

replacing the version y of the conversion function by the version x of the conversion function on the client computer, if the version x is more recent than the version y;

installing the version x of the client viewer application on the client computer, if the version x is more recent than the version z;

installing the version x of the client viewer application on the client computer, if the version x is less recent than the version z;

converting the document data into raster image data on the client computer, using the version of the conversion function on the client computer; and displaying image data representing document data to be rendered according to the print specifications, using the version x of the client viewer application.

11. The apparatus according to claim 10, wherein the print specifications include a number of parameters specific to the print engine.

12. The apparatus according to claim 11, wherein a parameter specific to the print engine is the format of the print medium.

13. The apparatus according to claim 11, wherein a parameter specific to the print engine is the position of the image data with respect to the print medium.

14. The apparatus according to claim 12, wherein a parameter specific to the print engine is the position of the image data with respect to the print medium.

15. The apparatus according to claim 10, wherein the print specifications include a scaling factor to be applied to the image data.

16. The apparatus according to claim 11, wherein the print specifications include a scaling factor to be applied to the image data.

17. The apparatus according to claim 10, wherein the print specifications include an angle of a rotation to be applied to the image data.

18. The apparatus according to claim 11, wherein the print specifications include an angle of a rotation to be applied to the image data.

19. A non-transitory computer readable medium containing a computer program product comprising computer-executable instructions for performing a method for viewing image data on a display unit of a client computer, the image data representing document data to be rendered by a print engine on a print medium according to print specifications, the client computer being arranged for exchanging data with a print server through a network, the print server being arranged for sending print instructions to the print engine, the client computer including a version y of a conversion function for converting document data into raster image data describing a dot arrangement to be rendered by the print engine and a version z of a client viewer application for viewing the image data according to the print specifications, the print server including a version x of the conversion function and a version x of the client viewer application, said computer program product comprising computer-executable instructions for causing at least one process unit to perform the steps of:

replacing the version y of the conversion function by the version x of the conversion function on the client computer, if the version x is more recent than the version y;

installing the version x of the client viewer application on the client computer, if the version x is more recent than the version z;

installing the version x of the client viewer application on the client computer, if the version x is less recent than the version z;

converting the document data into raster image data on the client computer, using the version of the conversion function on the client computer; and displaying image data representing document data to be rendered according to the print specifications, using the version x of the client viewer application.

* * * * *